United States Patent
Takeuchi et al.

(10) Patent No.: US 8,680,768 B2
(45) Date of Patent: Mar. 25, 2014

(54) LIGHT EMITTING DIODE LIGHTING CIRCUIT OF SADDLE-RIDE-TYPE VEHICLE

(75) Inventors: Yoshiaki Takeuchi, Wako (JP); Nobuyuki Takenaka, Wako (JP); Toru Hasegawa, Wako (JP); Shigeru Kodaira, Wako (JP); Hajime Soda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 434 days.

(21) Appl. No.: 13/176,073

(22) Filed: Jul. 5, 2011

(65) Prior Publication Data

US 2012/0001546 A1 Jan. 5, 2012

(30) Foreign Application Priority Data

Jul. 5, 2010 (JP) .................................. 2010-152911

(51) Int. Cl.
*B60Q 1/14* (2006.01)
(52) U.S. Cl.
USPC .............................................. 315/77; 315/80
(58) Field of Classification Search
USPC ................ 315/77, 80, 82–84; 362/36, 39–43, 362/45–46
See application file for complete search history.

(56) References Cited

U.S. PATENT DOCUMENTS

| 4,079,267 | A | 3/1978 | Ryczek et al. |
| 2004/0155604 | A1* | 8/2004 | Kobayashi ................... 315/291 |
| 2008/0150708 | A1* | 6/2008 | Takeuchi et al. ........... 340/426.1 |
| 2009/0079434 | A1 | 3/2009 | Osawa et al. |

FOREIGN PATENT DOCUMENTS

JP 2004-179228 6/2004

OTHER PUBLICATIONS

European Search Report dated Nov. 15, 2011 corresponding to European Patent Application No. 11171849.0.

* cited by examiner

*Primary Examiner* — Douglas W Owens
*Assistant Examiner* — Henry Luong
(74) *Attorney, Agent, or Firm* — Squire Sanders (US) LLP

(57) ABSTRACT

A method and apparatus for controlling lighting in a saddle-ride type vehicle includes a control unit configured to turn on a lamp comprising a light emitting diode. The apparatus also includes a manipulation switch which is turned on and off based upon manipulation by a rider. The control unit includes an input port receiving power from a power source based upon actuation of the manipulation switch, and an input circuit configured to determine a leak state of the manipulation switch based on an input voltage to the input port. A control part is configured to control lighting of the lamp based on a result of the determination. An erroneous lighting prevention resistance is connected between the manipulation switch and input circuit on one end, and ground on the other end. An intermittent power source switch is configured to be cyclically turned on or off by the control part, and is provided between the manipulation switch and the power source.

7 Claims, 7 Drawing Sheets

US 8,680,768 B2

LIGHT EMITTING DIODE LIGHTING CIRCUIT OF SADDLE-RIDE-TYPE VEHICLE

BACKGROUND

1. Field

The present invention relates to a light emitting diode lighting circuit of a saddle-ride-type vehicle such as a motorcycle, and more particularly to a circuit for preventing erroneous lighting of a light emitting diode caused by a leak current or the like from a lighting indicator switch of the light emitting diode.

2. Description of Related Art

As an example of a light emitting diode lighting circuit for preventing erroneous lighting of a light emitting diode, is disclosed in Patent Document 1. As shown in FIG. 1 of Patent Document 1 (Japanese Patent 4039623), the light emitting diode lighting circuit includes a transistor 12 and a differential amplifier 13 which is arranged in front of the transistor 12, a battery 11 is connected to a positive input side of the differential amplifier 13 through a switch 14, a reference resistance Rref is connected to the positive input side, a voltage of the battery 11 is dividedly supplied to a negative input side of the differential amplifier 13 using resistances R1, R2, an ON/OFF of the transistor 12 is controlled corresponding to the voltage difference between positive and negative inputting, and LEDs 9-1 to 9-n are lit in response to turning on of the transistor 12.

The LED used in the light emitting diode lighting circuit is turned on with a minute current and hence, there may be a case where even when a leak current flows at the time of turning off a switch for lighting the LED, the LED is turned on.

According to the above-mentioned configuration of the light emitting diode lighting circuit, values of the respective resistances are set such that the relationship of $Rs > (R1/R2) \times Rref$ is established with respect to a leak resistance Rs of the switch 14 and hence, the differential amplifier 13 is not brought into an ON state even when a leak current is generated in the switch 14. Accordingly, also the transistor 12 is not brought into an ON state thus preventing the LEDs 9-1 to 9-n from being lit.

However, in the above-mentioned circuit, the reference resistance Rref is necessary for preventing erroneous lighting caused by a leak current and therefore, there has been a drawback that heat is generated in the reference resistance Rref due to an electric current which flows at the time of generation of a leak current or at the time of turning on the switch 14.

SUMMARY

Embodiments of the present invention have been made in view of the above-mentioned circumstances. It is an object of the present invention to provide a light emitting diode lighting circuit which can prevent erroneous lighting caused by the generation of a leak current, and also can reduce the generation of heat due to a resistance connected to the light emitting diode lighting circuit for preventing erroneous lighting.

To achieve the above-mentioned object, the invention called for in a first embodiment is directed to a light emitting diode lighting circuit of a saddle-ride type vehicle including a control means which turns on a lamp formed of a light emitting diode mounted on a vehicle using a manipulation switch which is turned on or off in response to a manipulation by a rider. The control means can include an input port to which a power source voltage is inputted from a power source in response to turning on or off of the manipulation switch, and an input circuit part which determines a leak state of the manipulation switch (104) based on an input voltage to the input port. A control part can control lighting of the lamp based on a result of the determination by the input circuit part. An erroneous lighting prevention resistance is provided, which has one end thereof connected between the manipulation switch and the input circuit part and has the other end thereof grounded. An intermittent power source switch means is cyclically turned on or off by the control part, and is provided between the manipulation switch and the power source.

Another embodiment can include an ignition switch connected between the intermittent power source switch means and the power source, and the intermittent power source switch means is driven by the control part in response to an ON manipulation of the ignition switch.

Another embodiment is such that the input circuit part can compare magnitude of the cyclically inputted input voltage with a predetermined voltage value. When the magnitude of the input voltage is smaller than the predetermined voltage value, the input circuit part can determine that the manipulation switch is in a leak state and inhibits outputting of a lighting permission signal to the control part.

Another embodiment is such that the control means includes a drive means which performs lighting driving of the lamp in response to a drive signal from the control part.

In another embodiment, the lamp is a lighting circuit of a direction indicator, and the manipulation switch is mounted on a handle bar.

In another embodiment, a hazard switch is arranged parallel to the manipulation switch, and one end of the hazard switch is connected to the erroneous lighting prevention resistance.

In another embodiment, the light emitting diode lighting circuit can include a power source holding means which holds the supply of a voltage to the intermittent power source switch means by the control part when the ignition switch is changed from an ON state to an OFF state while holding the manipulation switch or the hazard switch in an ON state.

In another embodiment, holding of the power source by the control part is released when the manipulation switch or the hazard switch is changed from the ON state to the OFF state.

In another embodiment, when the input circuit part determines that the manipulation switch is in a leak state, at the time of performing a next leak determination by the input circuit part, the control part prolongs an ON time of the intermittent power source switch means which is cyclically turned on and off.

According to embodiments of the invention, in addition to the provision of the erroneous lighting prevention resistance, a voltage applied to the erroneous lighting prevention resistance is applied as an intermittent power source by the intermittent power source switch means which is cyclically turned on and off. Therefore, erroneous lighting of the light emitting diode due to leaking can be prevented while reducing the generation of heat by the erroneous lighting prevention resistance.

Further, by reducing the generation of heat by the erroneous lighting prevention resistance, a maximum output of the voltage inputted to the input circuit part (circuit which performs determination of a normal/leak state) can be increased. Therefore, the light emitting diode lighting circuit is hardly influenced by noises or the like and also leaking detection accuracy can be enhanced.

Also, in certain embodiments, the intermittent power source switch means is driven by the control part. Therefore, with respect to timing at which an input voltage is changed over between a high level and a low level by the intermittent power source switch means, a signal can be detected by the input circuit part at proper timing whereby the detection accuracy can be enhanced.

Further, the intermittent power source switch means can be driven in response to an ON manipulation of the ignition switch. Therefore, undesired driving of the intermittent power source switch means (126) can be prevented.

In certain embodiments, the input circuit part can determine a leak state and outputs a lighting permission signal to the control part. Therefore, it is possible to prevent an erroneous electric signal from being directly outputted to the control part at the time of leaking whereby a control specification can be simplified in addition to the prevention of the erroneous lighting.

In other embodiments, with the provision of the drive means which performs lighting driving of the lamp, the lamp can be indirectly turned on by the control means in response to the manipulation of the manipulation switch. Therefore, erroneous lighting of the lamp can be prevented, and also a non-waterproof switch can be adopted as the manipulation switch.

Although there is a possibility that the manipulation switch is brought into a leak state due to adhesion of rains or the like in a saddle-ride-type vehicle where the manipulation switch is mounted on the handle bar, by providing the manipulation switch in front of the control means, erroneous lighting can be prevented.

Further, a non-waterproof manipulation switch can be adopted and hence, the switch can be miniaturized thus facilitating wiring around a handle.

It is also possible to provide the erroneous lighting preventing structure for the hazard switch without newly providing the erroneous lighting prevention resistance for the hazard switch. In other words, for example, the erroneous lighting prevention resistance can be used in common by a blinker switch which constitutes the manipulation switch and the hazard switch.

In other embodiments, when the ignition switch is turned off while holding the manipulation switch or the hazard switch in an ON state, the light emitting diode can be held in a lit state thus enhancing visibility of an object to be observed.

The holding of the power source can be released by an OFF manipulation of the manipulation switch or the hazard switch. Therefore, even when the manipulation switch or the hazard switch is manipulated by a third party thereafter, the light emitting diode is not turned on whereby the erroneous lighting of the lamp due to a mischief or the like can be prevented.

In another embodiment, by prolonging the output time, a time during which whether or not leaking is generated is determined can be prolonged. Therefore, accuracy in the determination of leaking can be enhanced whereby the erroneous determination can be prevented.

DETAILED DESCRIPTION

Hereinafter, explanation is made with respect to one example of an embodiment of a light emitting diode lighting circuit of a saddle-ride-type vehicle of the present invention in conjunction with drawings.

Figure 1:
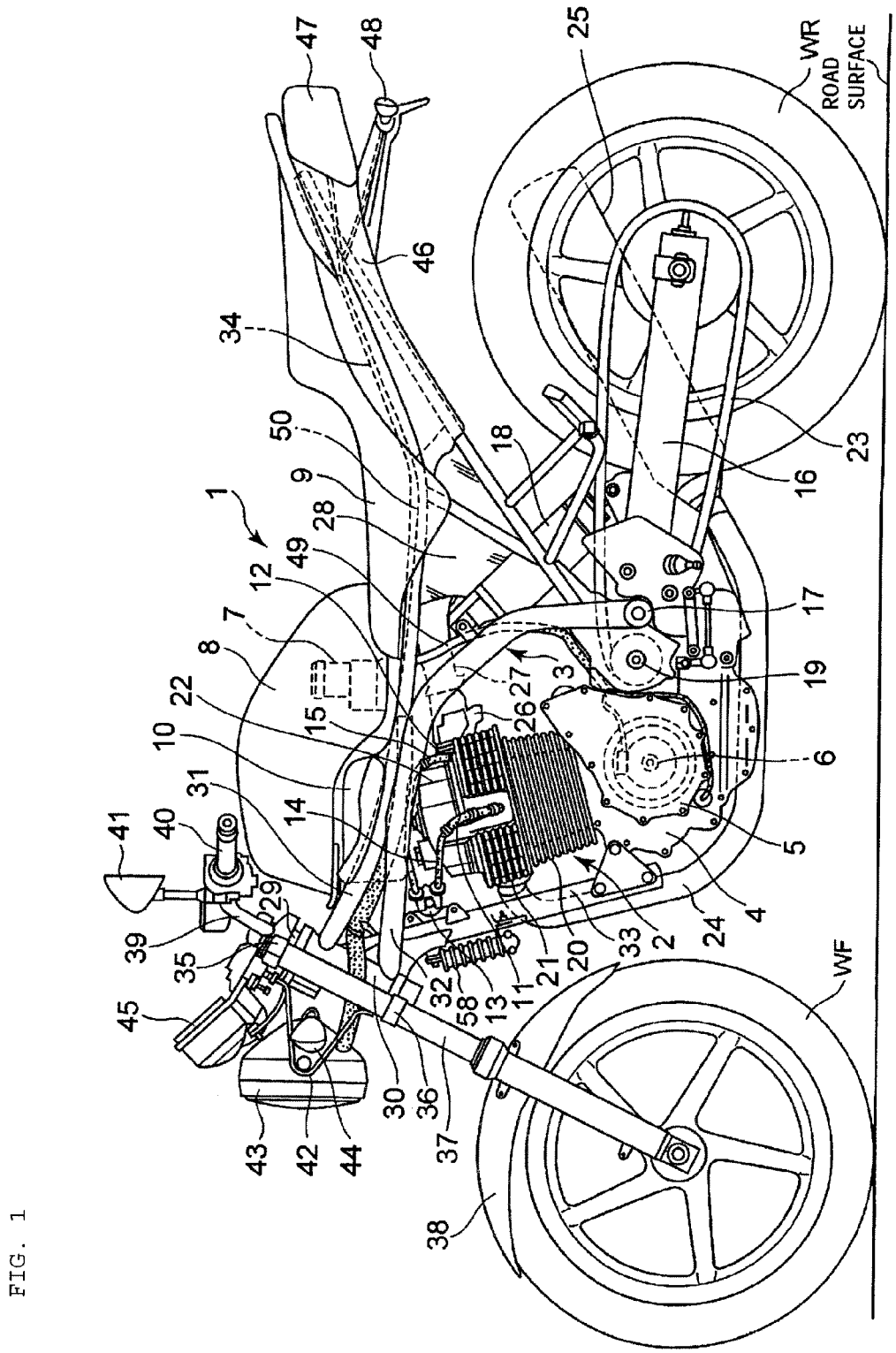
FIG. 1 is a left side view of a motorcycle on which a light emitting diode lighting circuit of the present invention is mounted.
Figure 2:
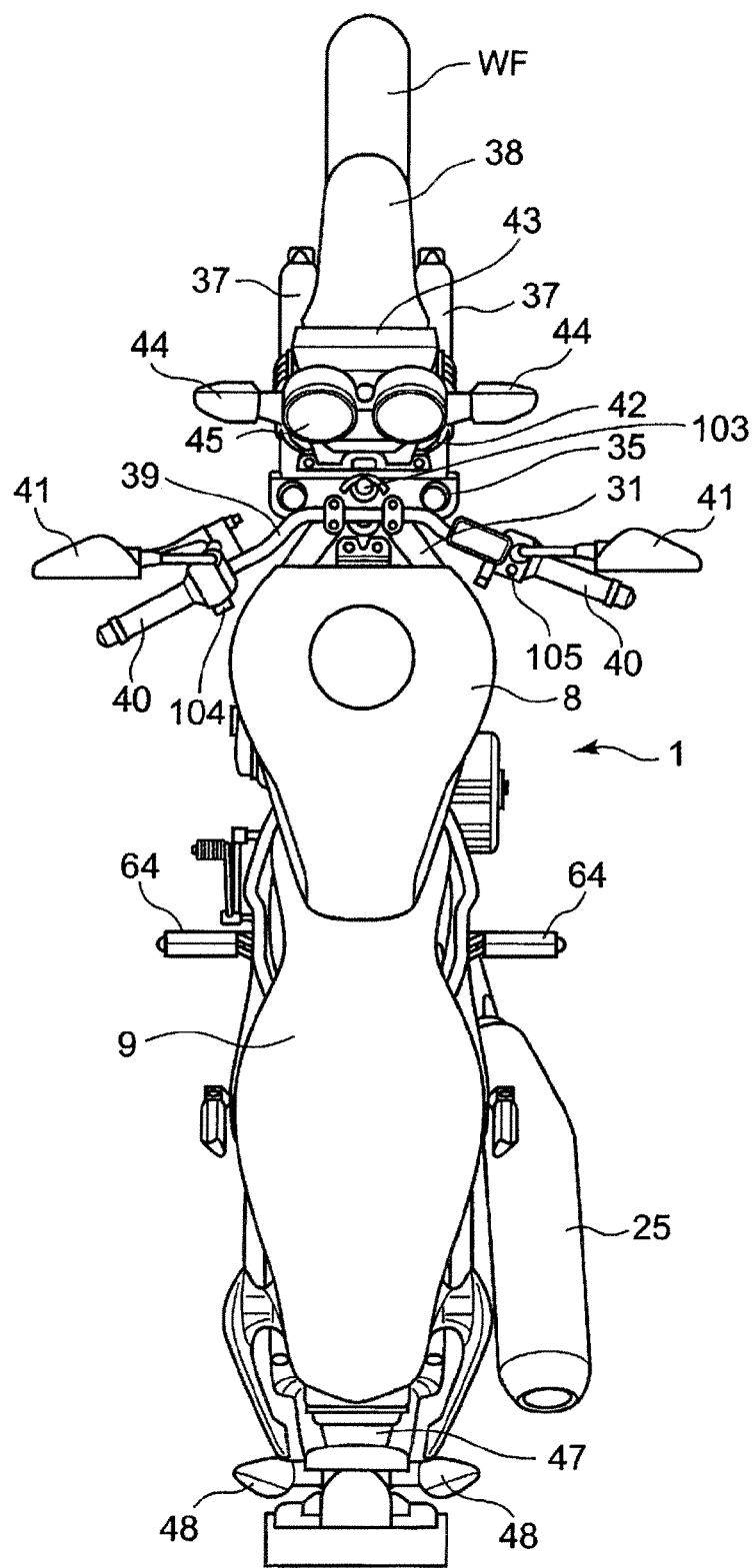
FIG. 2 is a top plan view of the motorcycle on which the light emitting diode lighting circuit of the present invention is mounted.

A light emitting diode lighting circuit according to embodiments of the present invention can be applied to a blinker lamp which is mounted on a saddle-ride-type vehicle such as a motorcycle, for example. FIG. 1 is a left side view of a motorcycle 1 on which a blinker lamp which is turned on by the light emitting diode lighting circuit of the present invention is mounted, and FIG. 2 is a top plan view of the motorcycle 1.

In this example, a twin-plug-type single-cylinder 4-cycle engine 2 is mounted on the motorcycle 1. A vehicle body frame 3 of the motorcycle 1 can be constituted of a head pipe 30, a first main frame 31, a second main frame 32, a down frame 33, a rear frame 34, and members such as gussets, brackets and stays which are jointed to these frames.

The engine 2 can include a cylinder 20, a cylinder head 21, a cylinder head cover 22, and a crankcase 4 is provided to a lower portion of the engine 2. The engine 2 is, in this example, held on the vehicle body frame 3 by connecting the crankcase 4 which is integrally joined to the engine 2 to the vehicle body frame 3 at plural positions. An AC generator 5 is provided to a vehicle-body left side of the crankcase 4. The AC generator 5 is connected to a crankshaft 6 of the engine 2 and is driven by the engine 2.

A fuel tank 8 which houses a fuel pump 7 therein and a tandem seat 9 are held, in this example, on the first main frame 31. A battery case 10 which accommodates a battery therein is arranged between the fuel tank 8 and the engine 2. The battery case 10 can be desirably made of a resin. A first ignition plug or spark plug 11 is mounted on a left wall of the cylinder head 21 of the engine 2, and a second ignition plug 12 is mounted on a rear wall of the cylinder head 21.

An ignition coil 13 is arranged in front of the cylinder head cover 22 (that is, above and in front of the cylinder head 21) and at the center in the vehicle widthwise direction. The first ignition plug 11 and the second ignition plug 12 are respectively connected to the ignition coil 13 via a first high tension wire or cord 14 and a second high tension cord 15. The first high tension cord 14 extends frontward while passing along a left side of the cylinder head cover 22. The second high tension cord 15 extends frontward while passing above the cylinder head cover 22.

A pivot boss 17, which supports a swing arm 16 in a vertically swingable manner, is formed on a lower end portion of the second main frame 32. The second main frame 32 suspends the swing arm 16 with a rear cushion 18 interposed therebetween. A rear wheel WR is pivotally and rotatably supported on a rear portion of the swing arm 16. A drive mechanism such as chain 23 extends between an output shaft 19 of a speed reduction gear which projects toward a left side of the vehicle body from the crankcase 4 and the rear wheel WR.

An exhaust pipe 24 which is pulled out from a front portion of the cylinder head 22 of the engine 2 is routed around a lower portion of the crankcase 4 and extends in the direction toward a right and rear side of the vehicle body. A muffler 25 is connected to a rear end portion of the exhaust pipe 24. An intake pipe 27 which includes a throttle body 26 is connected to a rear portion of the cylinder head 22, and an air cleaner 28 is connected to a rear end portion of the intake pipe 27.

The head pipe 30 rotatably holds a steering shaft 29, and a top bridge 35 and a bottom bridge 36 are connected to upper and lower portions of the steering shaft 29 respectively. A pair of left and right front forks 37 are held by the top bridge 35 and the bottom bridge 36, and a front wheel WF is pivotally and rotatably supported on lower ends of the front forks 37. A cover or front fender 38 for the front wheel WF is mounted on the front forks 37.

A rider-use step 64 can be arranged on left and right sides of the vehicle body frame 3. Further, a side stand (not shown in the drawing) can be connected to a lower portion of the vehicle body frame 3 in a state where the side stand is movable between a use position and a stored position.

An oil cooler 58 is mounted on a front side of the down frame 33 in the longitudinal direction of the vehicle body. The oil cooler 58 and the crankcase 4 are connected to each other by a pipe not shown in the drawing so as to circulate oil between the oil cooler 58 and the crankcase 4.

A handle bar 39 for steering is fixed to the top bridge 35, and a grip 40 and a mirror 41 are mounted on left and right sides of the handle bar 39 respectively. A headlight 43, front blinkers 44 and meters 45 are mounted on a stay 42 which extends frontward from the top bridge 35 and the bottom bridge 36.

An ignition switch 103 is arranged at a position in front of the handle bar 39. Further, a blinker switch 104 is mounted on an inner-side portion of the left grip 40 of the handle bar 39, and a hazard switch 105 is mounted on an inner-side portion of the right grip 40.

A tail light 47 and rear blinkers 48 which are mounted on a rear fender 46 are arranged behind the first main frame 31.

A harness 49 extends upwardly from the AC generator 5 and is merged with a main harness 50. The main harness 50 extends frontward and rearward in the longitudinal direction of the vehicle body, and is connected to the battery in the inside of the battery case 10, as well as lamps such as the headlight 43, the front blinkers 44, the tail light 47 and the rear blinkers 48, and electrical parts such as relays. Blinker lamps such as the front blinkers 44 and the rear blinkers 48 are respectively constituted of a plurality of light emitting diodes (LED).

Figure 3:
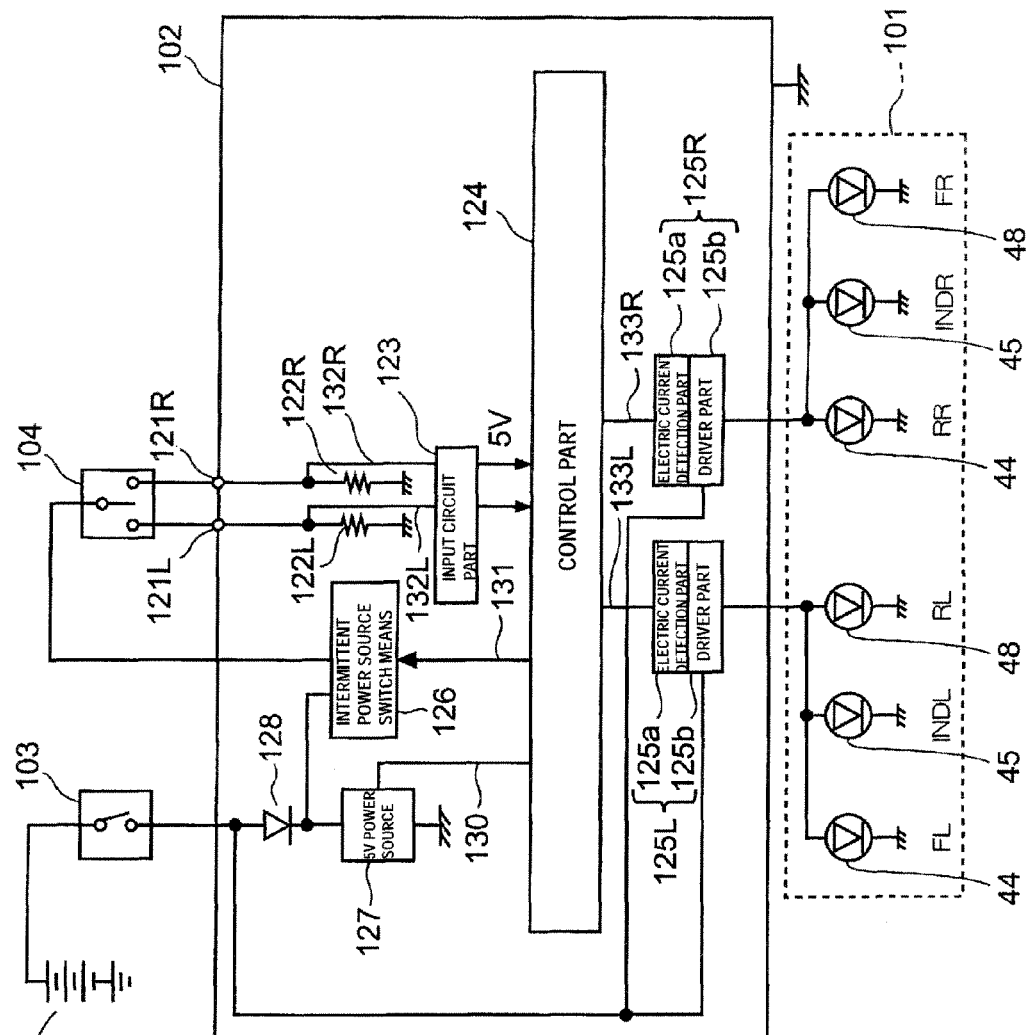
FIG. 3 is a block diagram showing one example of an embodiment of the light emitting diode lighting circuit of the present invention.

Configurations of the light emitting diode lighting circuit of the present invention is explained in conjunction with FIG. 3.

The light emitting diode lighting circuit can be mounted on a saddle-ride-type vehicle such as a motorcycle, and can include a control means 102 which turns on a blinker lamp 101 corresponding to the front blinkers 44, the rear blinkers 48 and the like shown in FIG. 1 and FIG. 2 in response to an ON/OFF manipulation of the blinker switch (manipulation switch) 104 mounted on the handle bar 39 by a rider.

The blinker lamp 101 in this example can include a front left LED (FL), a rear left LED (RL) and an indicator LED (INDL) which are turned on when turning to a left side, and a front right LED (FR), a rear right LED (RR) and an indicator LED (INDR) which are turned on when turning to a right side. That is, the front left LED (FL) and the front right LED (FR) respectively constitute the front blinkers 44, and the rear left LED (RL) and the rear right LED (RR) respectively constitute the rear blinkers 48. Further, the indicator LED (INDL) and the indicator LED (INDR) are arranged in the inside of the meters 45 mounted on the motorcycle 1, and function as indicators for confirming lighting.

A battery 100 is connected to the control means 102 via the ignition switch 103. Therefore, a power source voltage of 8 to 16V, for example, is supplied to the control means 102 from the battery 100 when the ignition switch 103 is in an ON state. Further, the blinker switch (manipulation switch) 104 which is provided for changing over a lighting state of the blinker lamp 101 among the left LED (FL, RL, INDL) lighting, the right LED (FR, RR, INDR) lighting and non-lighting is connected to the control means 102.

The control means 102 can include an input port 121L and an input port 121R which are connected to the blinker switch (manipulation switch) 104 which is connected to the battery 100 in series and to which a power source voltage is inputted in response to turning on/off of the blinker switch (manipulation switch) 104. Erroneous lighting prevention resistances 122L, 122R are respectively connected between the input port 121L and the input port 121R and a ground in series. An input circuit part 123 determines a leak state of the blinker switch (manipulation switch) 104. A control part 124 controls lighting of the blinker lamp 101 based on a result of the determination of the input circuit part 123. A drive means 125L for turning on the left LEDs (FL, RL, INDL) of the blinker lamp 101 and a drive means 125R for turning on the right LEDs (FR, RR, INDR) of the blinker lamp 101 in response to a signal from the control part 124. An intermittent power source switch means 126 cyclically supplies a power source voltage to a blinker switch (manipulation switch) 104 side. A 5V power source 127 supplies power source for driving to the control part 124.

The battery 100 is connected to the 5V power source 127 and the intermittent power source switch means 126 via the ignition switch 103 and a rectifying diode 128, and a power source voltage of 8 to 16V is supplied to the 5V power source 127 and the intermittent power source switch means 126 when the ignition switch 103 is in an ON state. The 5V power source 127 includes a step-down device or means. The 5V power source 127 steps down the voltage of 8 to 16V supplied from the battery 100 to 5V, and supplies the stepped-down voltage to the control part 124 through a power source line 130 as a driving power source.

Figure 4:
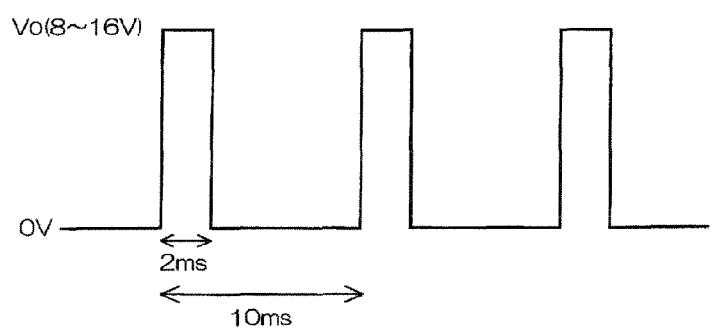
FIG. 4 is a view showing a voltage waveform of an intermittent power source which is applied to a blinker switch by driving an intermittent power source switch means.

When the intermittent power source switch means 126 is turned on and off, as shown in FIG. 4, an output voltage is alternately or cyclically changed between 0V and V0 (8 to 16V). The cyclic change of the output voltage takes place in such a manner that V0 is outputted for a period of 2 ms at a cycle of 10 ms, for example. Timing at which the output voltage is changed is set by giving a control timing signal to the intermittent power source switch means 126 from the control part 124 through a control line 131. It is sufficient that the outputting of V0 is continued for a minimum necessary time for determining erroneous lighting. The V0 output time may be set on a control part side in advance or may be set on an intermittent power source side in advance.

Accordingly, when the blinker switch (manipulation switch) 104 is turned on at a left LED lighting side in a state where the ignition switch 103 is in an ON state, an intermittent power source from the battery 100 is inputted to the input port 121L through the intermittent power source switch means 126, and a voltage of V0 is intermittently applied to both ends of the erroneous lighting prevention resistance 122L (resistance value Rref). The resistance value Rref is set to approximately 100Ω, for example.

Similarly, when the blinker switch (manipulation switch) 104 is turned on at a right LED lighting side, an intermittent power source from the battery 100 is inputted to the input port 121R, and a voltage of V0 is intermittently applied to both ends of the erroneous lighting prevention resistance 122R (resistance value Rref). On the other hand, when a leak current is generated due to a cause such as the adhesion of moisture (a leak current resistance Rm being approximately 1 kΩ, for example) even with the blinker switch (manipulation switch) 104 being in an OFF state, a power source voltage of V0 from the battery 100 is applied to the blinker switch (manipulation switch) 104 and the erroneous lighting prevention resistances 122 through the intermittent power source switch means 126, and a terminal voltage V1 (=Rref·V0/(Rm+Rref)) is generated on both ends of the erroneous lighting prevention resistance 122L or the erroneous lighting prevention resistance 122R. In this case, when the resistance value Rref is 100Ω, the terminal voltage V1 becomes 0.09 V0 (($^{100}/_{1100}$)V0=0.09 V0).

The terminal voltage generated in the erroneous lighting prevention resistance 122L and the erroneous lighting prevention resistance 122R is inputted to the input circuit part 123 through a signal line 132L and a signal line 132R and, the input circuit part 123 determines a leak state of the blinker switch (manipulation switch) 104. For example, when the blinker switch (manipulation switch) 104 is in an ON state (in a normal state), a voltage inputted to the input circuit part 123 becomes V0, when the blinker switch (manipulation switch) 104 is in an OFF state (in a normal state), the voltage inputted to the input circuit part 123 becomes 0, and when the blinker switch (manipulation switch) 104 is in an OFF state and the blinker switch 104 is in a leak state (at the time of leaking), the voltage inputted to the input circuit part 123 becomes Rref·V0/(Rm+Rref).

The input circuit part 123 determines whether the blinker switch (manipulation switch) 104 is in an ON state in a normal state or in other states (an OFF state in a normal state or in a leak state) based on an inputted voltage value. When magnitude of an input voltage is larger than a predetermined value (an ON state), the inputted voltage is outputted to the control part 124 as a lighting permission signal. Here, when a value of the voltage inputted to the input circuit part 123 is larger than 5V, the voltage value is stepped down to 5V and the stepped-down voltage is outputted to the control part 124 as the lighting permission signal.

Upon receiving the lighting permission signal, the control part 124 outputs a drive signal to the drive means 125L or the drive means 125R through a control line 133L or a control line 133R. On the other hand, when the magnitude of the inputted voltage is smaller than the predetermined value (an OFF state in a normal state or a leak state), the input circuit part 123 determines that the blinker switch (manipulation switch) 104 is in an OFF state or in a leak state and inhibits outputting of the lighting permission signal to the control part 124.

When the input circuit part 123 determines that the blinker switch (manipulation switch) 104 is in a leak state, at the time of performing a next leak determination, the time for outputting V0 which becomes an intermittent power source may be slightly prolonged based on a control timing signal from the control part 124. Due to such an operation, a time during which the input circuit part 123 determines whether or not leaking occurs in the blinker switch (manipulation switch) 104 can be prolonged so that accuracy in determination of leaking can be enhanced.

Each drive means 125 can include an electric current detection part 125a which detects an electric current in response to a drive signal through the control line 133, and a driver part 125b which supplies a power source voltage of the battery 100 to the lamp 101 when the electric current is detected in response to the drive signal.

Figure 5:
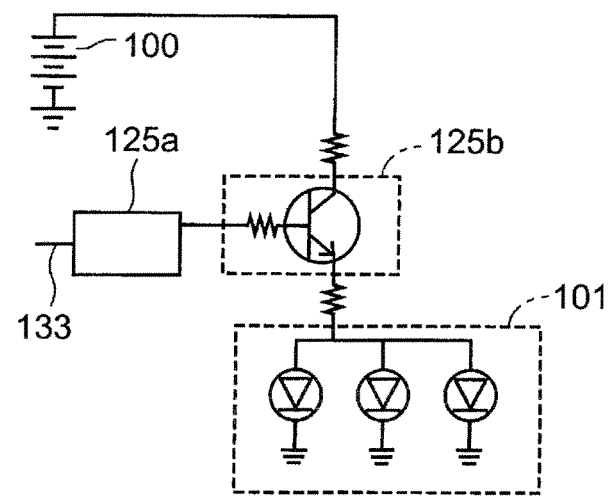
FIG. 5 is an explanatory view of the constitution of a drive means in the light emitting diode lighting circuit.

In other words, the electric current detection part 125a of each drive means 125, as shown in FIG. 5, detects an electric current inputted to the drive means 125 from the input circuit part 123 through the control line 133 in response to a drive signal, and outputs an ON signal to a gate of a transistor which functions as a switching element constituting the driver part 125b. In the driver part 125b, the transistor assumes an ON state in response to the signal inputted to the gate of the transistor through an input protective resistance so that an electric current flows in the respective LEDs from a power source voltage of the battery 100 whereby the lamp 101 is turned on.

Figure 6:
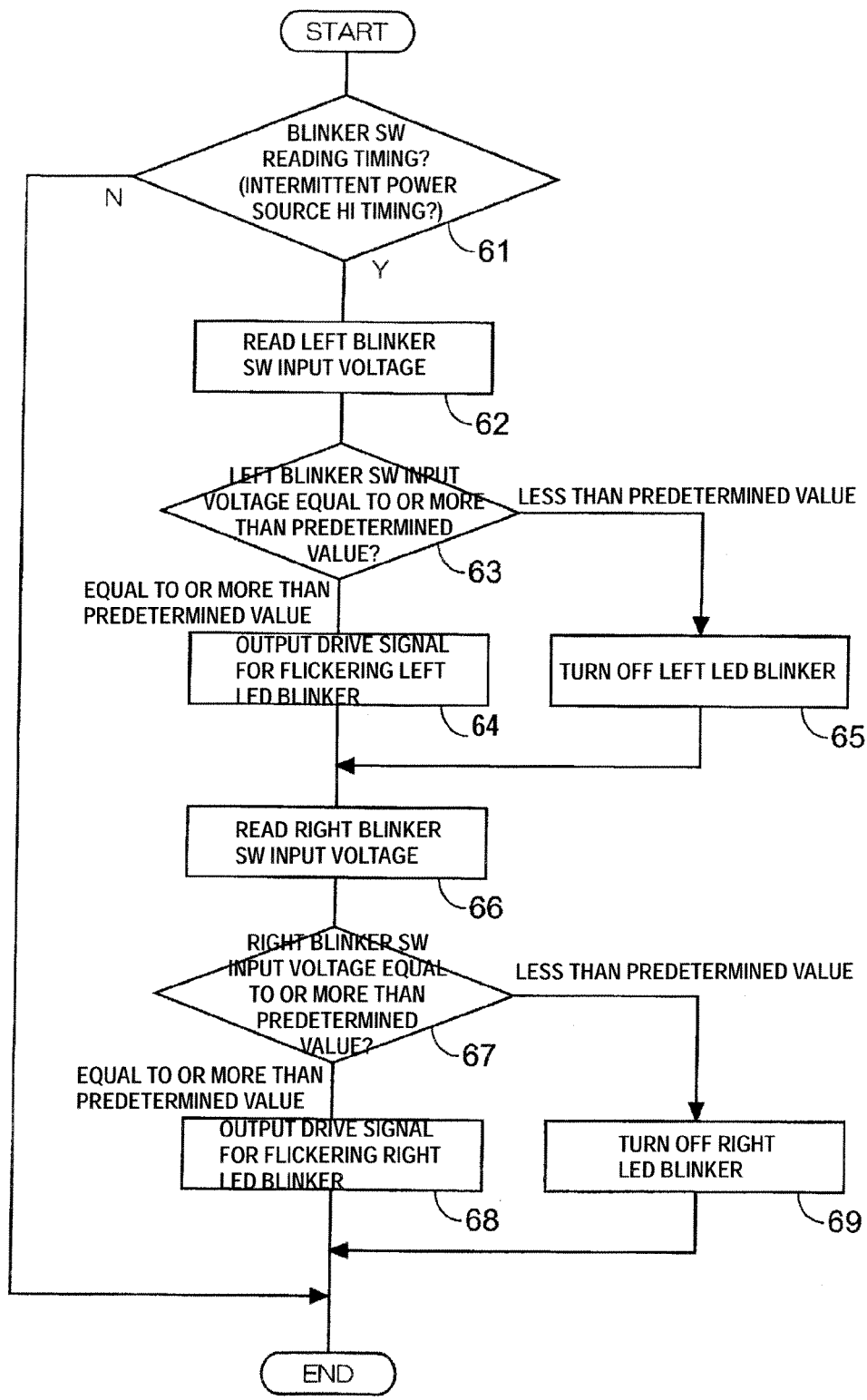
FIG. 6 is a flowchart showing steps of a lighting operation of the light emitting diode lighting circuit of the present invention.

Next, steps along which the lamp 101 is turned on by the control part 124 is explained in conjunction with a flowchart shown in FIG. 6.

The control part 124 intermittently turns on the intermittent power source switch means 126 by outputting a drive signal to the control line 131, and determines at step 61 whether or not this drive signal outputting is performed at timing synchronous with reading timing (timing at which the intermittent power source in FIG. 4 assumes a "high level").

When it is determined that the timing is the reading timing, firstly, the control part 124 reads, at step 62, an input voltage (a terminal voltage of the erroneous lighting prevention resistance 122L) corresponding to the left blinker of the blinker switch 104.

The control part 124 determines at step 63 whether or not the input voltage to the blinker switch 104 is equal to or more than a predetermined value which is set in advance. When it is determined that the input voltage is equal to or more than the predetermined value, the control part 124 outputs at step 64 a drive signal for flickering the left blinker to the drive means 125L. The predetermined value is set to a value which is smaller than the power source voltage V0(8 to 16V) and is larger than the Rref·V0/(Rm+Rref) in advance.

The light emitting diodes FL, INDL and RL of the lamp 101 flicker in response to the drive signal from the drive means 125L. Further, when it is determined that the input voltage is less than the predetermined value, the drive signal is not outputted so that the left blinker is brought into an OFF state a step 65.

Subsequently, the control part 124 reads at step 66 an input voltage (a terminal voltage of the erroneous lighting prevention resistance 122R) corresponding to the right blinker of the blinker switch 104.

The control part 124 determines at step 67 whether or not the input voltage to the blinker switch 104 is equal to or more than the predetermined value which is set in advance. When it is determined that the input voltage is equal to or more than the predetermined value, the control part 124 outputs at step 68 a drive signal for flickering the right blinker to the drive means 125R.

The light emitting diodes FR, INDR and RR of the lamp 101 flicker in response to the drive signal from the drive means 125R. Further, when it is determined that the input voltage is less than the predetermined value, the drive signal is not outputted so that the right blinker is brought into an OFF state at step 69.

According to the light emitting diode lighting circuit described above, the determination on whether the blinker switch 104 is turned on or off is performed by detecting a terminal voltage of the erroneous lighting prevention resistances 122 by the input circuit part 123 when a power source voltage is supplied from the intermittent power source switch means 126 (when the voltage shown in FIG. 4 is at a "high level"). In other words, when a voltage applied to both ends of the erroneous lighting prevention resistance 122L (resistance value Rref) is equal to or more than the above-mentioned predetermined value, it is determined that the blinker switch 104 is turned on at the L side. When a voltage applied to both ends of the erroneous lighting prevention resistance 122R (resistance value Rref) is equal to or more than the predetermined value, it is determined that the blinker switch 104 is turned on at the R side. Further, in other cases (cases where the voltage is smaller than the predetermined value including a case where the voltage is 0V), it is determined that the blinker switch 104 is in an OFF state.

Accordingly, when a leak current is generated in the blinker switch 104, a voltage inputted to the input circuit part 123 becomes smaller than the predetermined value and hence, it is determined that the blinker switch 104 is in an OFF state, and lighting of the light emitting diode by the drive means 125 is not performed whereby it is possible to prevent the occurrence of erroneous lighting of the lamp 101 when a leak current is generated.

Further, in these cases, a power source voltage is intermittently applied to the erroneous lighting prevention resistances 122. Therefore, it is possible to achieve heat radiation at timing where an intermittent power source is turned off thus realizing reduction of a heat value attributed to resistance compared to a case where the power source voltage is always applied to the erroneous lighting prevention resistances 122.

Further, the power source voltage is applied intermittently and hence, provided that an allowable heat value is equal between these cases, it is possible to increase a maximum output of a voltage inputted to the input circuit part 123 and hence, the input circuit part 123 is hardly influenced by noises or the like, and also leaking detection accuracy can be enhanced.

Accordingly, even when a conventional non-waterproof blinker switch is used as the blinker switch of this embodiment for realizing reduction of cost and downsizing at a time of replacing a blinker bulb of the lamp with an LED to enhance the degree of freedom in design, it is possible to prevent the occurrence of erroneous lighting attributed to a leak current which occurs when rain or the like is adhered to the blinker switch. Further, a heat value can be also reduced and hence, it is unnecessary to provide a heat radiation mechanism to the light emitting diode lighting circuit. Also when a water-proof blinker switch is prepared, the blinker switch of this embodiment can be easily exchanged with such a blinker.

Further, the blinker switch can be miniaturized by adopting a low-power-consumption resistance as the erroneous lighting prevention resistances 122.

Figure 7:
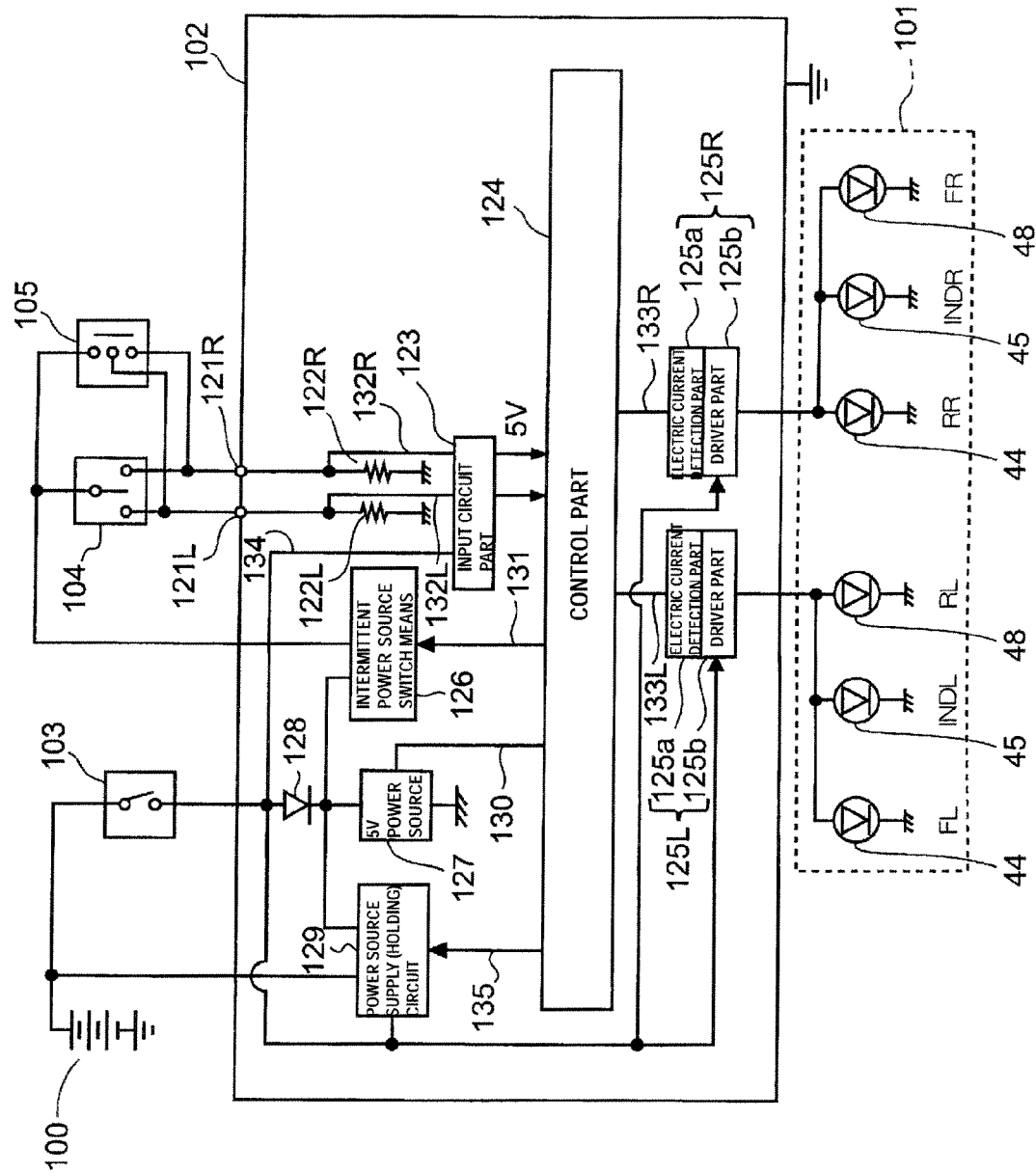
FIG. 7 is a block diagram showing another example of the embodiment of the light emitting diode lighting circuit of the present invention.

FIG. 7 shows another example of the light emitting diode lighting circuit, wherein parts having the substantially same constitutions as the corresponding parts shown in FIG. 3 are given same symbols.

In this light emitting diode lighting circuit, the hazard switch 105 is connected parallel to the blinker switch (manipulation switch) 104. Wiring is made such that one end side of the hazard switch 105 is connected to the erroneous lighting prevention resistances 122 so that an intermittent power source is applied to the respective erroneous lighting prevention resistances 122L, 122R when the hazard switch 105 is turned on, and the application of the intermittent power source is interrupted when the hazard switch 105 is turned off.

Further, a power source supply circuit 129 which constitutes a power source holding means is connected between the battery 100 and the intermittent power source switch means 126 in series. The power source supply circuit 129 applies a power source voltage from the battery 100 to the intermittent power source switch means 126, and the power source supply circuit 129 also is connected such that the supply of a power source voltage from the battery 100 to the driver part 125b of the drive means 125 is held when the ignition switch 103 is changed from an ON state to an OFF state while holding the blinker switch (manipulation switch) 104 or the hazard switch 105 in an ON state.

A voltage supply line 134 from the ignition switch 103 is connected to the input circuit part 123 thus allowing the input circuit part 123 to perform the on/off determination of the ignition switch 103. A control line 135 from the control part 124 which controls the supply of an output from the power source supply circuit 129 is connected to the power source supply circuit 129.

When the input circuit part 123 detects an ON/OFF state of the ignition switch 103 through the voltage supply line 134, the control part 124 supplies a holding signal for holding the supply of a power source from the battery 100 through the control line 135. When the blinker switch 104 or the hazard switch 105 is changed from an ON state to an OFF state, the control part 124 receives such a change, and the control part 124 supplies a release signal for releasing the holding of the power source through the control line 135.

Figure 8:
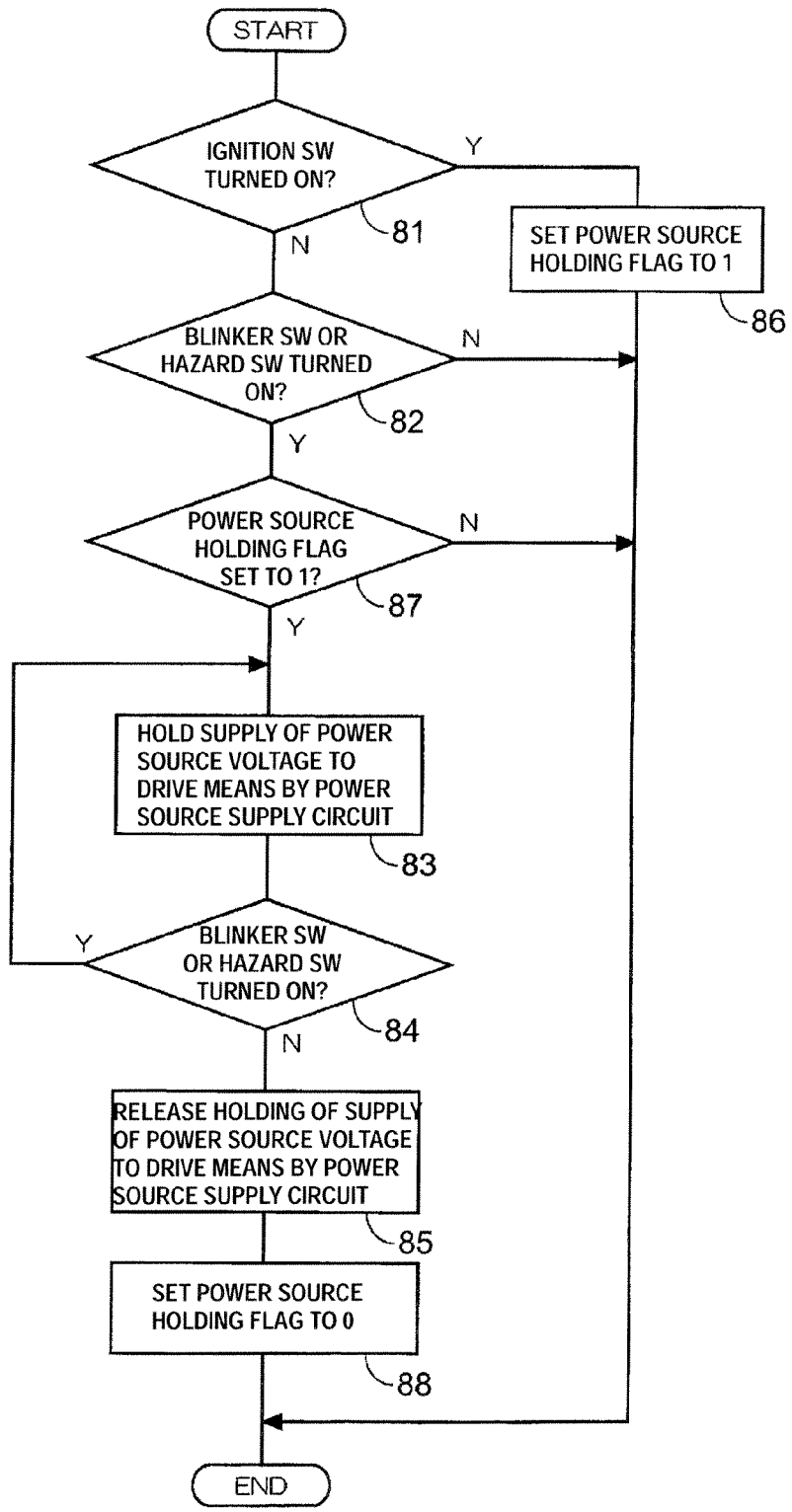
FIG. 8 is a flowchart showing steps of a power source supply holding operation in the light emitting diode lighting circuit of the present invention.

Next, the explanation is made with respect to the steps along which holding of a power source for the power source supply circuit 129 is performed by the control part 124 in conjunction with a flowchart shown in FIG. 8.

The control part 124 detects an ON/OFF state of the ignition switch 103 after the ignition switch 103 is once brought into an ON state through the voltage supply line 134. When a situation detected by the control part 124 at step 81 is that an ON state of the ignition switch 103 continues, the power source supply circuit 129 sets a power source holding flag to "1" at step 86 without supplying a power source to the drive means 125.

When the ignition switch 103 is brought into an OFF state from an ON state, whether or not the blinker switch 104 or the hazard switch 105 is in an ON state is detected at step 82. This detection is performed in such a manner that the input circuit part 123 determines a value of a terminal voltage of the erroneous lighting prevention resistances 122 due to the application of an intermittent power source from the battery 100 through the power source supply circuit 129 and the intermittent power source switch means 126. In other words, as has been explained in conjunction with the light emitting diode lighting circuit shown in FIG. 3, the input circuit part 123 compares the value of the terminal voltage with the predetermined value which is set in advance, and when the value is larger than the predetermined value, it is determined that the blinker switch 104 or the hazard switch 105 is in an ON state.

When the blinker switch 104 or the hazard switch 105 is in an ON state, it is confirmed at step 87 whether or not the power source holding flag is set to "1". When the power source holding flag is set to "1", the input circuit part 123 outputs a lighting permission signal to the control part 124. Upon receiving the lighting permission signal, the control part 124 outputs a power source supply holding signal to the power source supply circuit 129 through the control line 135, and the power source supply circuit 129 supplies a power source voltage from the battery 100 to the drive means 125 at step 83.

When the blinker switch 104 or the hazard switch 105 is in an OFF state at this point of time, the power source supply circuit 129 does not supply the power source voltage to the drive means 125.

Next, it is determined again at step 84 whether or not the blinker switch 104 or the hazard switch 105 is in an ON state. The determination on whether or not the blinker switch 104 or the hazard switch 105 is in an ON state, step 84, is performed for every fixed time, and the holding of the power source voltage to the drive means 125 is performed by the power source supply circuit 129 so long as an ON state of the blinker switch 104 or the hazard switch 105, steps 83 and 84, is continued.

When the blinker switch 104 or the hazard switch 105 is changed from an ON state to an OFF state, the control part 124 outputs a release signal for releasing the holding of the power source to the power source supply circuit 129 through the control line 135. The power source supply circuit 129 which receives the release signal releases the supply of the power source voltage from the battery 100 to the drive means 125 at step 85, and sets the power source holding flag to "0" at step 88.

In other words, the flag is set to "0" when the ignition switch 103 is in an OFF state and after the holding of the power source to the drive means 125 is released once and hence, even when a third party brings the blinker switch 104 or the hazard switch 105 of a stopped vehicle into an ON state by mischief or the like, a function of holding the power source by the power source holding circuit 129 is inoperable and hence, the LED is not turned on.

Only when the blinker switch 104 or the hazard switch 105 is in an ON state and the ignition switch 103 is brought into an OFF state from an ON state, the power source holding circuit 129 can perform the function of holding the power source supplied to the drive means 125. Due to such a configuration, even when an engine is stopped, lighting of the LED can be continued.

According to the above-mentioned light emitting diode lighting circuit, in addition to the advantageous effect acquired by the light emitting diode lighting circuit shown in FIG. 3, the light emitting diode lighting circuit can additionally acquire a hazard lighting function while preventing erroneous lighting caused by a leak current. Also when a waterproof hazard switch is prepared, the hazard switch of this example can be easily exchanged with such a hazard switch.

Further, in the substantially same manner as the blinker switch of the light emitting diode lighting circuit shown in FIG. 3, even when a conventionally existing non-waterproof hazard switch is used in place of the hazard switch of this example for reduction of cost, it is possible to prevent the occurrence of erroneous lighting caused by a leak current at the time of adhesion of rains or the like, and also a heat value generated by the erroneous lighting prevention resistance is also small. Therefore, it is unnecessary to mount a heat radiation mechanism.

Description of Reference Numerals And Signs

1: motorcycle, 39: handle bar; 44: front blinker, 45: meter, 48: rear blinker, 100: battery, 101: lamp, 102: control means, 103: ignition switch, 104: blinker switch (manipulation switch), 105: hazard switch, 121: input port, 122: erroneous lighting prevention resistance, 123: input circuit part, 124: control part, 125: drive means, 125*a*: current detection part, 125*b*: driver part, 126: intermittent power source switch means, 127: 5V power source, 129: power source supply circuit, 130: power source line, 131: control line, 132: signal line, 133: control line, 134: voltage supply line, 135: control line

We claim:

1. A light emitting diode lighting circuit of a saddle-ride type vehicle, said light emitting diode lighting circuit comprising:
   a control means configured to turn on a lamp comprised of a light emitting diode mounted on a vehicle;
   a manipulation switch which is turned on or off in response to a manipulation by a rider;
   a power source for supplying a power source voltage; and
   an ignition switch, wherein the control means comprises:
      a drive means, which performs lighting driving of the lamp,
   wherein the control means further comprises:
      an intermittent power source switch means connected to the power source via the ignition switch, the intermittent power source switch means being cyclically turned on or off by a control part in response to turning on the ignition switch so as to intermittently supply the power source voltage to one side of the manipulation switch;
      an input port coupled to another side of the manipulation switch, wherein the input port receives the intermittently supplied power source voltage from the intermittent power source switch means in response to turning on the manipulation switch;
      an input circuit part which determines a state of the manipulation switch based on an input voltage to the input port; and
      an erroneous lighting prevention resistance which has one end thereof connected between the input port and the input circuit part and has the other end thereof grounded so as to generate a voltage smaller than the power source voltage on both ends thereof in a leak state of the manipulation switch;
   wherein the control part controls lighting of the lamp based on a result of the determination by the input circuit part;
   the drive means performs lighting driving of the lamp in response to a drive signal from the control part; and
   the input circuit part compares a magnitude of the input voltage at the input port with a predetermined voltage value, such that:
      when the magnitude of the input voltage is larger than the predetermined voltage value, the input circuit part determines that the manipulation switch is in an ON state and outputs the input voltage to the control part as a lighting permission signal; and
      when the magnitude of the input voltage is smaller than the predetermined voltage value, the input circuit part determines that the manipulation switch is in an OFF state or a leak state and inhibits outputting of a lighting permission signal to the control part.

2. The light emitting diode lighting circuit of the saddle-ride type vehicle according to claim 1, wherein the input circuit part compares the magnitude of the cyclically inputted input voltage with the predetermined voltage value.

3. The light emitting diode lighting circuit of the saddle-ride type vehicle according to claim 1, wherein the lamp is a lighting circuit of a direction indicator, and the manipulation switch is mounted on a handle bar.

4. The light emitting diode lighting circuit of the saddle-ride type vehicle according to claim 1, wherein a hazard switch is arranged parallel to the manipulation switch, and one end of the hazard switch is connected to the erroneous lighting prevention resistance.

5. The light emitting diode lighting circuit of the saddle-ride type vehicle according to claim 4, comprising a power source holding means which holds the supply of a voltage to the intermittent power source switch means by the control part when the ignition switch is changed from an ON state to an OFF state while holding the manipulation switch or the hazard switch in an ON state.

6. The light emitting diode lighting circuit of the saddle-ride type vehicle according to claim 5, wherein the holding of the power source by the control part is released when the manipulation switch or the hazard switch is changed from the ON state to the OFF state.

7. The light emitting diode lighting circuit of the saddle-ride type vehicle according to claim 1, wherein when the input circuit part determines that the manipulation switch is in a leak state, at the time of performing a next leak determination by the input circuit part, the control part prolongs an ON time of the intermittent power source switch means which is cyclically turned on and off.

* * * * *